(12) United States Patent
Suzuki et al.

(10) Patent No.: US 6,650,555 B2
(45) Date of Patent: Nov. 18, 2003

(54) SWITCHED-CAPACITOR-TYPE STABILIZED POWER CIRCUIT

(75) Inventors: Tomohiro Suzuki, Kashihara (JP); Katsumi Inaba, Tondabayashi (JP); Toshiyuki Fujita, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/180,106

(22) Filed: Jun. 27, 2002

(65) Prior Publication Data

US 2003/0057929 A1 Mar. 27, 2003

(30) Foreign Application Priority Data

Sep. 27, 2001 (JP) .......................... 2001-298065

(51) Int. Cl.[7] .............................................. H02M 3/18
(52) U.S. Cl. ....................................................... 363/60
(58) Field of Search ...................... 363/59, 60; 327/536; 307/110

(56) References Cited

U.S. PATENT DOCUMENTS

| | | | | |
|---|---|---|---|---|
| 5,680,300 A | * | 10/1997 | Szepesi et al. ................. | 363/59 |
| 6,411,531 B1 | * | 6/2002 | Nork et al. ..................... | 363/60 |
| 6,522,558 B2 | * | 2/2003 | Henry ........................... | 363/60 |
| 6,538,907 B2 | * | 3/2003 | Hoshino et al. ............... | 363/60 |

FOREIGN PATENT DOCUMENTS

| | | |
|---|---|---|
| JP | 07-274513 | 10/1995 |
| JP | 09-191639 | 7/1997 |
| JP | 2000-236658 | 8/2000 |

* cited by examiner

*Primary Examiner*—Shawn Riley
(74) *Attorney, Agent, or Firm*—Harness, Dickey & Pierce, P.L.C.

(57) ABSTRACT

A switch selects an inputted direct-current voltage at rising of the inputted direct-current voltage, and selects an outputted voltage after the rising of the outputted voltage, for an input to the constant voltage circuit which supplies power to a control circuit. Therefore, once the step-up operation is carried out in a state where the inputted direct-current voltage is at or greater than the operation voltage of the control circuit, the power source of the control circuit is switched to the side of the outputted voltage which has been increased even when the inputted direct-current voltage decreases. Consequently, the voltage of the power source of the control circuit stays at or greater than the operation voltage of the control circuit, and the stabilized power circuit can carry out a proper operation. This function prevents the operation from being inadequate due to a decrease of the inputted direct-current voltage, and a proper operation can be carried out. Further, a signal of the hysteresis comparator is used for the switching for an input of the constant voltage circuit which supplies the power source to the control section. Thus, the circuit can be simplified.

8 Claims, 5 Drawing Sheets

SWITCHED-CAPACITOR-TYPE STABILIZED POWER CIRCUIT

FIELD OF THE INVENTION

The present invention relates to a switched-capacitor-type stabilized power circuit in which switching elements are respectively provided before and after a capacitor so as to carry out step-up operation by switching a connection of the capacitor and an inputted direct-current power source between series and parallel, and in particular to a switched-capacitor-type stabilized power circuit using batteries as the inputted direct-current power source.

BACKGROUND OF THE INVENTION

Figure 5:
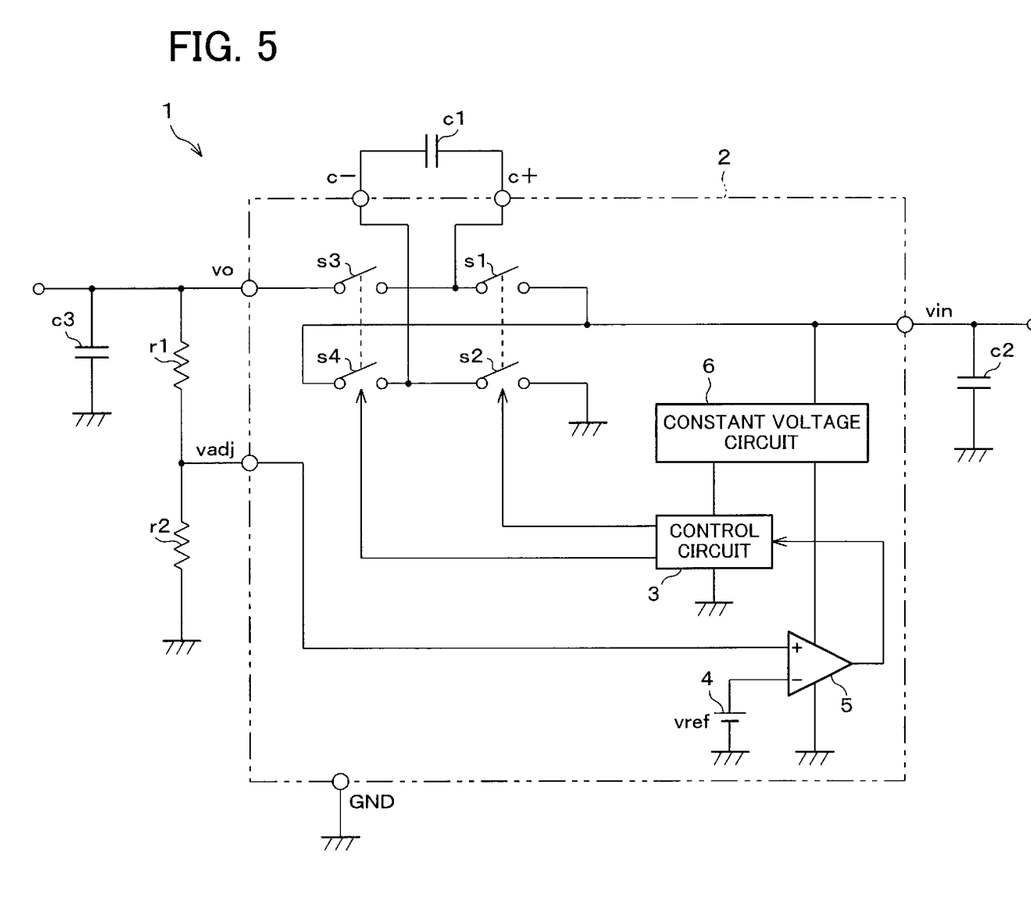
FIG. 5 is a block diagram showing an electrical arrangement of a typical switched-capacitor-type stabilized power circuit adopting a conventional technique.

FIG. 5 is a block diagram showing an electrical arrangement of a typical switched-capacitor-type stabilized power circuit 1 adopting a conventional technique. The switched-capacitor-type stabilized power circuit 1 generally has an arrangement such that a step-up capacitor c1, an input smoothing capacitor c2, an output smoothing capacitor c3 and voltage-dividing resistors r1 and r2 for an outputted voltage feedback are externally provided to a control circuit chip 2.

The step-up capacitor in the switched-capacitor-type stabilized power circuit 1 has a single stage arrangement denoted by a reference code cl. In the control circuit chip 2, a pair of switches s1 and s2 is provided before the capacitor c1, and a pair of switches s3 and s4 is provided after the capacitor c1. The control circuit 3 turns on/off the pair of switches s1 and s2 at the same time, and turns on/off the pair of switches s3 and s4 at the same time. Further, the control circuit 3 makes the pair of switches s1 and s2, and the pair of switches s3 and s4 to carry out a reverse operation each other (the pair of switches s1 and s2 is on when the pair of switches s3 and s4 is off, and the pair of switches s1 and s2 is off, when the pair of switches s3 and s4 is on.)

In a charge-period, the pair of switches s1 and s2 is on, and an inputted direct-current voltage vin from a battery is applied to the capacitor c1 after being smoothed by the capacitor c2. Thus, the capacitor c1 is charged with the inputted direct-current voltage vin. In a discharge period, the pair of switches s3 and s4 is on, and the inputted direct-current voltage vin and a charged voltage of the capacitor c1 are joined together. Therefore, a voltage of 2×vin is supplied to the capacitor c3. This voltage is smoothed by the capacitor c3, and is outputted as an outputted voltage vo. In this manner, a step-up operation to double the voltage is carried out.

The output voltage vo becomes a feedback voltage vadj after being divided by the voltage-dividing resistors r1 and r2, and is compared to a reference voltage vref from a reference voltage source 4 by a hysteresis comparator 5, and a result of the comparison is inputted to the control circuit 3. The control circuit 3 makes the pair of switches s1 and s2 and the pair of switches s3 and s4 to carry out the switching operation until the feedback voltage vadj reaches to the reference voltage vref, and makes the pair of switches s1 and s2 and the pair of switches s3 and s4 to stop the operation when the feedback voltage vadj reaches to the reference voltage vref. As described, the outputted voltage vo stays constant regardless of a load.

In the stabilized power circuit 1 having the foregoing arrangement, the inputted direct-current voltage vin is supplied from a constant voltage circuit 6 as a power source to the control circuit 3, and also to the hysteresis comparator 5 which control the switching operation. Accordingly, in the case of the input from a battery, when the voltage of the battery decreases to a voltage smaller than the operation voltage of the control circuit 3 or the like, the control operation does not work properly, and the outputted voltage vo decreases due to an increase of on-state resistance of the switching elements which are included in the switches s1, s2, s3 and s4.

SUMMARY OF THE INVENTION

The present invention is made to provide a switched-capacitor-type stabilized power circuit capable of carrying out a proper step-up operation even when an inputted direct-current decreases.

In order to solve the foregoing problems, the switched-capacitor-type stabilized power circuit of the present invention includes;

switching elements provided before and after a capacitor;
a control section which controls the switching elements, for switching a connection of the capacitor and an inputted direct-current power source between series and parallel, so as to carry out step-up operation;
a feedback comparator which gives feedback of information relating to an outputted voltage to the control section, so as to stabilize the outputted voltage;
a constant voltage circuit which supplies power to the control section; and
switching means for selecting an inputted direct-current voltage at rising of the inputted direct-current voltage, and selecting an outputted voltage after the rising of the outputted voltage, for a voltage supplied to the constant voltage circuit in response to the feedback comparator.

With the foregoing arrangement, the switched-capacitor-type stabilized power circuit selects the inputted direct-current voltage at rising of the inputted direct-current voltage and selects the outputted voltage after the rising of the outputted voltage for the voltage supplied to the constant voltage circuit which supplies power to the control section by using a signal from the feedback comparator which gives feedback of information relating to the outputted voltage to the control section so as to stabilize the outputted voltage.

Accordingly, once the step-up operation is carried out in a state where the inputted direct-current voltage is at or greater than the operation voltage of the control section, it is possible to maintain a proper operation even when the inputted direct-current voltage decreases. Further, a signal of the hysteresis comparator is used for the switching for an input of the constant voltage circuit which supplies the power source to the control section. Thus, the circuit can be simplified.

Further, in order to solve the foregoing problems, the switched-capacitor-type stabilized power circuit of the present invention includes;

switching elements provided before and after a capacitor;
a control section which controls the switching elements, for switching a connection of the capacitor and an inputted direct-current power source between series and parallel, so as to carry out step-up operation;
a constant voltage circuit which supplies power to the control section; and
switching means for selecting the inputted direct-current voltage at rising of the inputted direct-current voltage and selecting the outputted voltage after the rising of the outputted voltage and selecting a off-state when the outputted voltage is higher than a predetermined level, for the voltage supplied to the constant voltage circuit.

With the foregoing arrangement, the switched-capacitor-type stabilized power circuit selects the inputted direct-current voltage at rising of the inputted direct-current voltage and selecting the outputted voltage after the rising of the outputted voltage and selecting the off-state when the outputted voltage is higher than the predetermined level, for the voltage supplied to the constant voltage circuit which supplies power to the control section.

Accordingly, once the step-up operation is carried out in a state where the inputted direct-current voltage is at or greater than the operation voltage of the control section, it is possible to maintain a proper operation even when the inputted direct-current voltage decreases. Further, under light-load condition and when the outputted voltage is higher than the predetermined level, there will be no troubles if the step-up operation by the switched-capacitor stops. Thus, in that condition, the power supply to the constant voltage circuit is cut off, and the operation of the control section is stopped. Therefore, power consumption can be reduced.

Further, a step-up circuit may be provided for carrying out the step-up operation with respect to the voltage supplied to the constant voltage circuit at the rising of the inputted direct-current voltage.

With the foregoing arrangement, even in the state where the inputted direct-current voltage is at or smaller than the operation voltage of the control section, it is possible to supply a voltage at or greater than the operation voltage of the control section. Thus, a proper operation can be carried out even in the state where the inputted direct-current voltage is at or smaller than the operation voltage of the control section.

Further, in addition to the foregoing arrangement, step-up stopping means may be provided for cutting off the voltage supplied to the constant voltage circuit after the rising of the outputted voltage.

With the foregoing arrangement, it is possible to stop unnecessary operation of the step-up circuit, and power consumption can be reduced.

Furthermore, in addition to the foregoing arrangement, the step-up stopping means may be the feedback comparator which gives feedback of the outputted voltage to the control section so as to stabilize the outputted voltage.

with the foregoing arrangement, the circuit can be simplified since the feedback comparator works as the step-up stopping means.

Additional objects, features, and strengths of the present invention will be made clear by the description below. Further, the advantages of the present invention will be evident from the following explanation in reference to the drawings.

DESCRIPTION OF THE EMBODIMENTS

Embodiment 1

Figure 1:
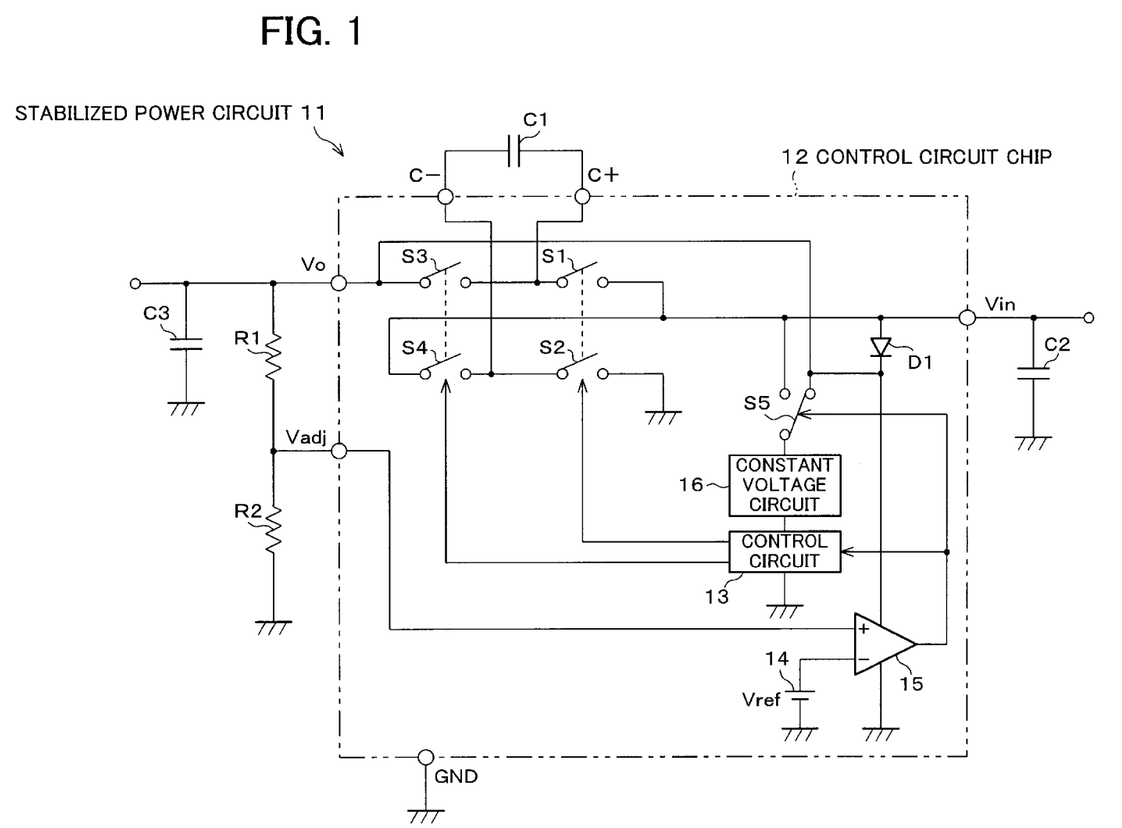
FIG. 1 is a block diagram showing an electrical arrangement of a switched-capacitor-type stabilized power circuit according to a first embodiment of the present invention.

The following will explain one embodiment of the present invention with reference to FIG. 1.

FIG. 1 is a block diagram showing an electrical arrangement of a switched-capacitor-type stabilized power circuit 11 according to a first embodiment of the present invention. This switched-capacitor-type stabilized power circuit 11 generally has an arrangement such that a step-up capacitor C1, an input smoothing capacitor C2, an output smoothing capacitor C3 and voltage-dividing resistors R1 and R2 for an outputted voltage feedback are externally provided to a control circuit chip 12.

The step-up capacitor in the switched-capacitor-type stabilized power circuit 11 is shown as a single stage circuit denoted by a reference code C1; however, it may of course be arranged as a multiple stages circuit according to the relation between an inputted direct-current voltage Vin and a desired outputted voltage Vo. In the control circuit chip 12, a pair of switches S1 and S2 is provided before the capacitor C1, and a pair of switches S3 and S4 is provided after the capacitor C1. The control circuit 13 turns on/off the pair of switches Si and S2 at the same time, and turns on/off the pair of switches S3 and S4 at the same time. Further the control circuit 13 makes the pair of switches S1 and S2, and the pair of switches S3 and S4 to carry out a reverse operation each other (the pair of switches S1 and S2 is on when the pair of switches S3 and S4 is off, and the pair of switches S1 and S2 is off, when the pair of switches S3 and S4 is on).

In a charge-period, the pair of switches S1 and S2 is on and an inputted direct-current voltage Vin from a battery is applied to the capacitor C1 after being smoothed by the capacitor C2. Thus, the capacitor C1 is charged with the inputted direct-current voltage Vin. In a discharge period, the pair of switches S3 and S4 is on, and the inputted direct-current voltage Vin and a charged voltage of the capacitor C1 are joined together. Therefore, a voltage of 2×Vin is applied to the capacitor C3. The voltage is smoothed by the capacitor C3, and is outputted as an outputted voltage Vo. In this manner, a step-up operation to double the voltage is carried out.

The output voltage Vo becomes a feedback voltage Vadj after being divided by the voltage-dividing resistors R1 and R2, and is compared to a reference voltage Vref from a reference voltage source 14 by a hysteresis comparator 15, and a result of the comparison is inputted to the control circuit 13. The control circuit 13 makes the pair of switches S1 and S2 and the pair of switches S3 and S4 to carry out the switching operation until the feedback voltage Vadj reaches the reference voltage Vref, and makes the pair of switches S1 and S2 and the pair of switches S3 and S4 to stop the operation when the feedback voltage Vadj reaches to the reference voltage Vref. When the feedback voltage decreases again, the control circuit 13 makes the switches to carry out the switching operation again. By thus repeating these operations, the outputted voltage Vo stays constant regardless of a load.

It is noticeable that the stabilized power circuit 11 has a structure such that the inputted direct-current voltage Vin is supplied to the control circuit 13 and the hysteresis comparator 15 as a power source at its rising, and the outputted voltage Vo is supplied to the control circuit 13 and the hysteresis comparator 15 as the power source after its rising.

Accordingly, firstly, the inputted direct-current voltage Vin is supplied to the hysteresis comparator 15 as the power source via a diode D1, and the outputted voltage Vo is supplied to a cathode side of the diode D1. Therefore, at the rising of the inputted direct-current voltage Vin which becomes the outputted voltage Vo of 0 or remarkably small, the diode D1 is turned on and the inputted direct-current voltage Vin is supplied as the power source. Also, the diode D1 is turned off in response to the rising of the outputted voltage Vo rises and where Vo>Vin+VF (VF is a forward voltage of the diode D1), and the outputted voltage Vo is supplied as the power source. In this manner, the diode D1 first automatically switches the power source of the hysteresis comparator 15.

Next, either of the inputted direct-current voltage Vin or the outputted voltage Vo is supplied to a constant voltage circuit 16, which is the power source of the control circuit 13, by selectively switching between the inputted voltage Vin and the outputted voltage Vo with a switch S5. As described, the switch S5 is switched by the hysteresis comparator 15, i.e., by an output from the hysteresis comparator 15 which gives feedback of information relating the outputted voltage Vo to the control circuit 13 so as to stabilize the outputted voltage Vo. With this operation, the inputted direct-current voltage Vin is supplied to the constant voltage circuit 16 until a feedback voltage Vadj reaches to a reference voltage Vref, and the outputted voltage Vo is supplied to the constant voltage circuit 16 when the feedback voltage Vadj reaches to the reference voltage Vref.

Accordingly, once the step-up operation is carried out in a state where the inputted direct-current voltage Vin is at or greater than the operation voltage of the control circuit 13, the power source of the control circuit 13 is switched to the side of the outputted voltage Vo which has been increased even when the inputted direct-current voltage Vin decreases. Consequently, the voltage of the power source of the control circuit 13 stays at or greater than the operation voltage of the control circuit 13, and the stabilized power circuit 11 can carry out a proper operation.

Further, the switching for the power source with respect to the hysteresis comparator 15 can simply be performed by the diode D1. Then, the diode D1 controls the switching operation of the switches S1 through S4. Also, as to the switching for the power source with respect to the control circuit 13, which needs higher voltage accuracy, a signal of the hysteresis comparator 15 is used. Thus, the circuit can be simplified.

Embodiment 2

Figure 2:
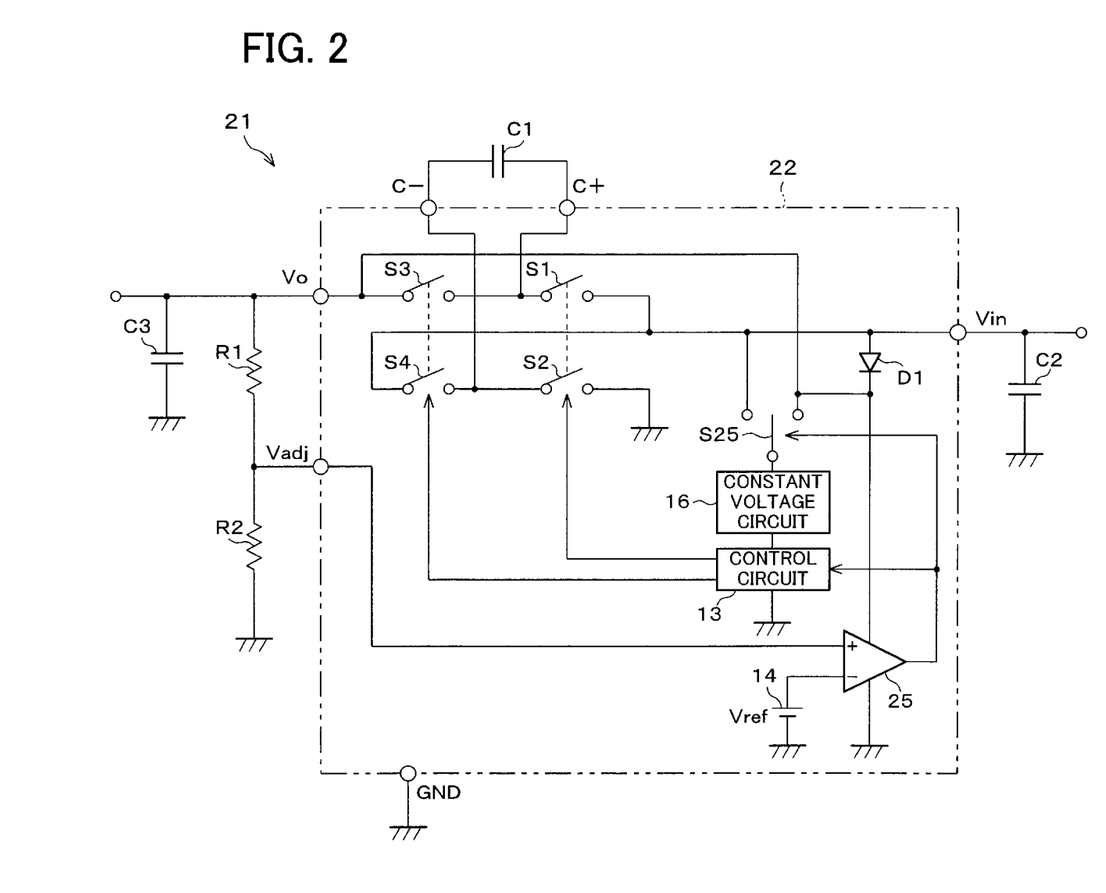
FIG. 2 is a block diagram showing an electrical arrangement of a switched-capacitor-type stabilized power circuit according to the second embodiment of the present invention.

FIG. 2 is a block diagram showing an electrical arrangement of a switched-capacitor-type stabilized power circuit 21 according to a second embodiment of the present invention. The switched-capacitor-type stabilized power circuit 21 is similar to the described switched-capacitor-type stabilized power circuit 11. The members of the switched-capacitor-type stabilized power circuit 21 having the same function as that of the switched-capacitor-type stabilized power circuit 11 therefore has the same reference code, and the explanations thereof will be omitted. It is noticeable that a switch S25 having an off-state is provided instead of the described switch S5 and a hysteresis comparator 25 is adopted corresponding to the switch S25 in the control circuit chip 22 of the switched-capacitor-type stabilized power circuit 21.

The hysteresis comparator 25 causes the switch S25 to select the side of the inputted direct-current voltage Vin until the feedback voltage Vadj reaches to the reference voltage Vref, and causes the switch S25 to select the side of the outputted voltage Vo when the feedback voltage Vadj reaches to the reference voltage Vref. Also, the hysteresis comparator 25 causes the switch S25 to select the off-state when the feedback voltage Vadj is higher than the reference voltage Vref and the difference is greater than a predetermined level.

Accordingly, under light-load condition and when the outputted voltage Vo is higher than a predetermined level, there will be no troubles if the step-up operation stops. Thus, in that state, the power supply to the constant voltage circuit 16 is cut off, and the operation of the control circuit 13 is stopped. Therefore, power consumption can be reduced.

Embodiment 3

Figure 3:
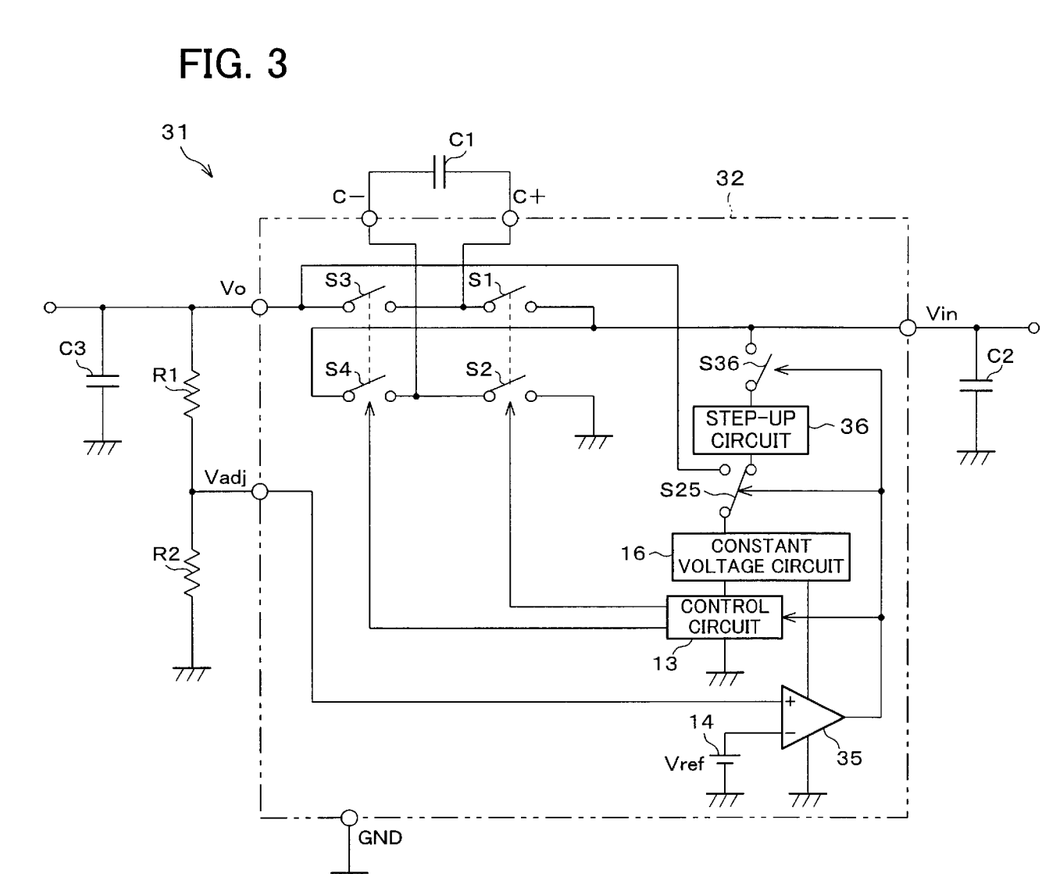
FIG. 3 is a block diagram showing an electrical arrangement of a switched-capacitor-type stabilized power circuit according to the third embodiment of the present invention.
Figure 4:
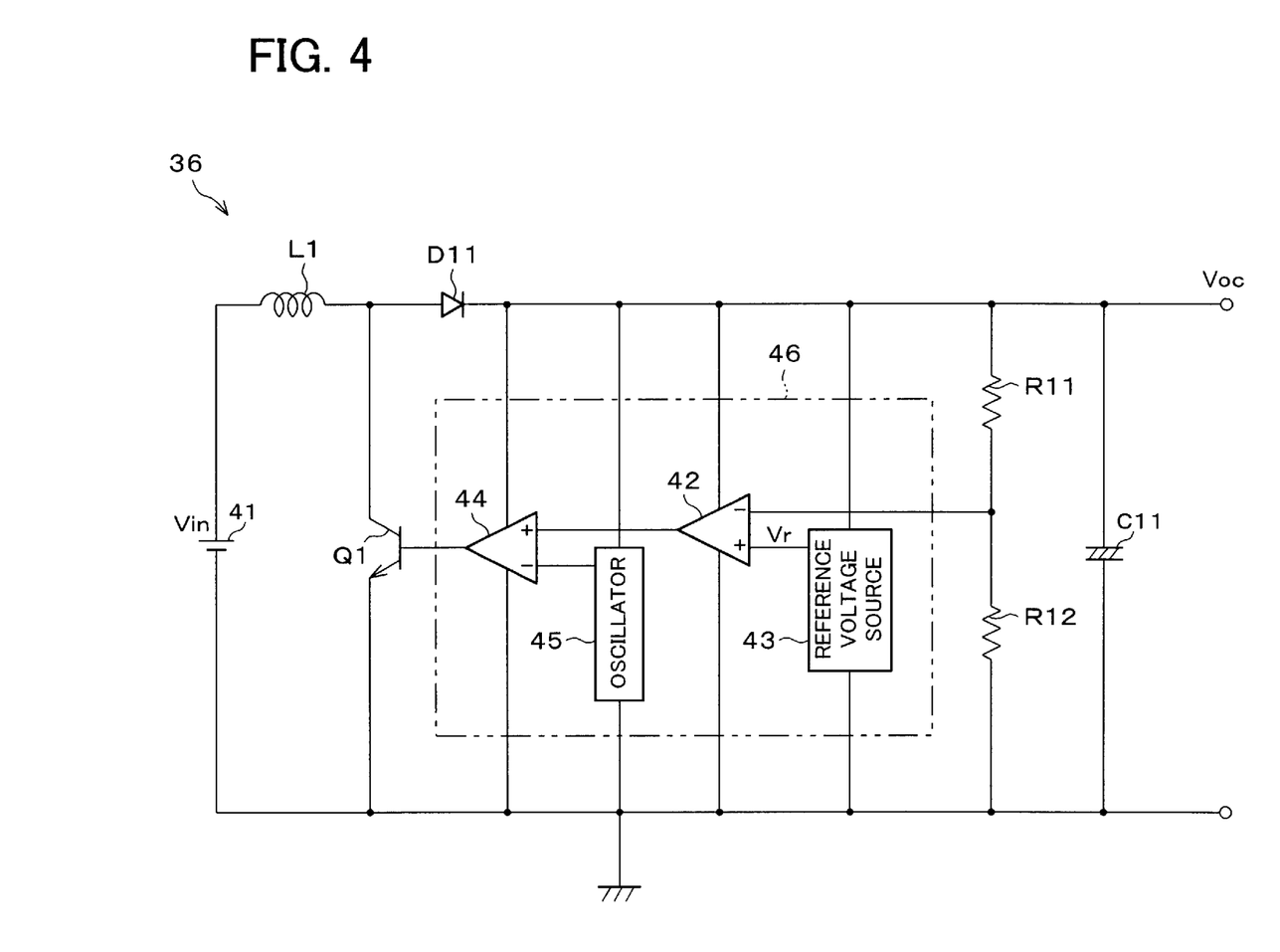
FIG. 4 is a block diagram specifically showing an example of an arrangement of a step-up circuit in the switched-capacitor-type stabilized power circuit shown in FIG. 3.

The following will explain a third embodiment of the present invention with reference to FIGS. 3 and 4.

FIG. 3 is a block diagram showing an electrical arrangement of the switched-capacitor-type stabilized power circuit 31 according to the third embodiment of the present invention.

The switched-capacitor-type stabilized power circuit 31 is similar to the described switched-capacitor-type stabilized power circuit 21. The members of the switched-capacitor-type stabilized power circuit 21 having the same function as that of the switched-capacitor-type stabilized power circuit 21 therefore has the same reference code, and the explanations thereof will be omitted. In the switched-capacitor-type stabilized power circuit 31, it is noticeable that an step-up circuit 36 is provided on a control chip 36 so as to increase the inputted direct-current voltage Vin, and also, a switch S36 is provided on the input side to the step-up circuit 36.

The hysteresis comparator 35 controls the switching operation of the switch S25, and also controls the switching operation of the switch S36. Then, either of an outputted voltage of the step-up circuit 36 via the constant voltage circuit 16 or the outputted voltage Vo is supplied to the hysteresis comparator 35 as a power source.

Therefore, when there is no power supplied, the hysteresis comparator 35 turns on the switch S36 and makes the switch S25 to be connected to the step-up circuit 36. Then, power is supplied from the step-up circuit 36 via the constant voltage circuit 16 at the rising of the inputted direct-current voltage Vin, and also, the hysteresis comparator 35 starts the operation for causing the switch S25 to stay in the side of the inputted direct-current voltage Vin and for keeping the switch S36 turned on until the feedback voltage Vadj reaches to the reference voltage Vref. Further, when the feedback voltage Vadj reaches to the reference voltage Vref, the hysteresis comparator 35 causes the switch S25 to select the side of the outputted voltage Vo and turns off the switch S36. Thereafter, when the feedback voltage Vadj is higher than the reference voltage Vref and the difference becomes greater than a predetermined level, the hysteresis comparator 35 causes the switch S25 to select the off-state.

FIG. 4 is a block diagram schematically showing an example of the arrangement of the step-up circuit 36. The step-up circuit 36 adopts a switching system in which a serial circuit including a coil L1 and a switching element Q1 is connected to a power source 41 of the inputted direct-current voltage Vin. When the switching element Q1 is off, the step-up circuit 36 retrieves energy, which is conserved in the coil L1 when the switching element Q1 is on, via a diode D11. Then, the conserved energy is smoothed by a smoothing capacitor C11 and is outputted to the constant voltage circuit 16. The step-up circuit 36 repeats this performance as the step-up operation.

An outputted voltage Voc from the smoothing capacitor C11 is divided by voltage-dividing resistors R11 and R12 and is inputted to an error amplifier 42. The error amplifier 42 outputs a voltage corresponding to the difference between the outputted voltage Voc and a reference voltage Vr from a reference voltage source 43. The outputted voltage from the error amplifier 42 is inputted to PWM (Pulse Width Modulation) comparator 44. The PWM comparator 44 produces a PWM signal for driving the switching element Q1 by slicing a triangular wave from the oscillator 45 with the threshold which is the same as the outputted voltage. In this manner, the outputted voltage Voc is increased so as to be a desired voltage.

In the step-up circuit 36 having a foregoing arrangement, power is supplied via the diode D11 to the error amplifier 42, the reference voltage source 43, the PWM comparator 44 and the oscillator 45, which are included in the control circuit 46. Therefore, the switching element Q1 can be turned on as long as the inputted direct-current voltage Vin is not less than the voltage VBE (the voltage between a base and an emitter of the switching element Q1)+a forward voltage VF of the diode D1 (about 1 V as it has a small current), and the switching operation can be carried out even when the inputted direct-current voltage Vin is smaller the voltage for properly operating the control circuit 46. Also, once the switching operation is started, the outputted voltage Voc gradually increases and reaches to the voltage for properly operating the control circuit 46. Therefore, it is possible to stably operate the step-up circuit 36 even when the inputted direct-current voltage Vin is low.

As described, even when the inputted direct-current voltage Vin at the rising is at or lower than the operating voltage of the control circuit 13, it becomes possible to carry out the proper step-up operation by using the step-up circuit 36. Further, since the switch S36 cut off the power supply to the step-up circuit 36 in response to the rising of the outputted voltage Vo, it is possible to prevent unnecessary operation of the step-up circuit 36, thereby reducing power consumption. Furthermore, the circuit can be simplified since the signal outputted from the hysteresis comparator 35 is used for the switching operation of the switch S36.

Note that, Japanese Unexamined Patent Publication No. 2000-236658 (published on Aug. 29, 2000) discloses the technique for using an inputted voltage as a power source when power is on, to a control circuit which normally uses a voltage generated from a charge pump. However, there is no description or suggestion for using a signal outputted from the hysteresis comparator 15 which gives feedback of information relating to an outputted voltage to the control section so as to stabilize the outputted voltage, or for cutting off the power supply to the constant voltage circuit 16 when the outputted voltage is higher than a predetermined level. The present invention is especially worked-out for those points.

As described, the switched-capacitor-type stabilized power circuit (11, 21 and 31) of the present invention includes;
switching elements (S1 and S2; S3 and S4) provided before and after a capacitor (C1);
a control section (a control circuit 13) which controls the switching elements, for switching a connection of the capacitor and an inputted direct-current power source between series and parallel, so as to carry out step-up operation;
a feedback comparator (a hysteresis comparator 15, 25 and 35) which gives feedback of information relating to an outputted voltage to the control section, so as to stabilize the outputted voltage;
a constant voltage circuit (16) which supplies power to the control section; and
switching means (S5, S25) for selecting an inputted direct-current voltage at rising of the inputted direct-current voltage, and selecting an outputted voltage after the rising of the outputted voltage, for a voltage supplied to the constant voltage circuit in response to the feedback comparator.

With the foregoing arrangement, once the step-up operation is carried out in a state where the inputted direct-current voltage is at or greater than the operation voltage of the control circuit, the power source of the control circuit is switched to the side of the outputted voltage which has been increased even when the inputted direct-current voltage decreases. Consequently, the voltage of the power source of the control circuit stays at or greater than the operation voltage of the control circuit, and the stabilized power circuit can carry out a proper operation.

Further, a signal of the hysteresis comparator is used for the switching for an input of the constant voltage circuit which supplies the power source to the control section. Thus, the circuit can be simplified.

Further, the switched-capacitor-type stabilized power circuit (21, 31) of the present invention includes;
switching elements (S1 and S2; S3 and S4) provided before and after a capacitor (C1);
a control section (a control circuit 13) which controls the switching elements, for switching a connection of the capacitor and an inputted direct-current power source between series and parallel, so as to carry out step-up operation;
a constant voltage circuit (16) which supplies power to the control section; and
switching means (S25) for selecting the inputted direct-current voltage at rising of the inputted direct-current voltage and selecting the outputted voltage after the rising of the outputted voltage and selecting a off-state when the outputted voltage is higher than a predetermined level, for the voltage supplied to the constant voltage circuit.

With the foregoing arrangement, once the step-up operation is carried out in a state where the inputted direct-current voltage is at or greater than the operation voltage of the control circuit, the power source of the control circuit is switched to the side of the outputted voltage which has been increased even when the inputted direct-current voltage decreases. Consequently, the voltage of the power source of the control circuit stays at or greater than the operation voltage of the control circuit, and the stabilized power circuit can carry out a proper operation.

Further, under light-load condition and when the outputted voltage is higher than the predetermined level, there will be no troubles if the step-up operation by the switched-capacitor stops. Thus, in that condition, the power supply to the constant voltage circuit is cut off, and the operation of the control section is stopped. Therefore, power consumption can be reduced.

Further, the switched-capacitor-type stabilized power circuit (31) of the present invention further includes a step-up circuit (36) for carrying out the step-up operation with respect to the voltage supplied to the constant voltage circuit at the rising of the inputted direct-current voltage.

With the foregoing arrangement, even in the state where the inputted direct-current voltage is at or smaller than the operation voltage of the control section, it is possible to supply a voltage at or greater than the operation voltage of the control section. Thus, the switched-capacitor-type stabilized power circuit can carry out a proper operation even in the state where the inputted direct-current voltage is at or smaller than the operation voltage of the control section.

Further, the switched-capacitor-type stabilized power circuit (31) of the present invention further includes step-up stopping means (S36, a hysteresis comparator 35) for cutting off the voltage supplied to the constant voltage circuit after the rising of the outputted voltage.

With the foregoing arrangement, as described, since the outputted voltage is supplied to the control circuit as the power source, it is possible to stop unnecessary operation of the step-up circuit, and power consumption can be reduced.

Furthermore, the switched-capacitor-type stabilized power circuit of the present invention uses the feedback comparator (35) which gives feedback of the outputted voltage to the control section so as to stabilize the outputted voltage, as the step-up stopping means.

with the foregoing arrangement, the circuit can be simplified since the feedback comparator works as the step-up stopping means.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A switched-capacitor-type stabilized power circuit, comprising:

switching elements provided before and after a capacitor;

a control section which controls the switching elements, for switching a connection of the capacitor and an inputted direct-current power source between series and parallel, so as to carry out step-up operation;

a feedback comparator which gives feedback of information relating to an outputted voltage to the control section, so as to stabilize the outputted voltage;

a constant voltage circuit which supplies power to the control section; and switching means for selecting an inputted direct-current voltage at rising of the inputted direct-current voltage, and selecting an outputted voltage after the rising of the outputted voltage, for a voltage supplied to the constant voltage circuit in response to the feedback comparator.

2. The switched-capacitor-type stabilized power circuit as set forth in claim 1, further comprising:

a step-up circuit which carries out a step-up operation with respect to the voltage supplied to the constant voltage circuit at the rising of the inputted direct-current voltage.

3. The switched-capacitor-type stabilized power circuit as set forth in claim 2, further comprising:

step-up stopping means for cutting off the voltage supplied to the constant voltage circuit after the rising of the outputted voltage.

4. The switched-capacitor-type stabilized power circuit as set forth in claim 3, wherein:

the step-up stopping means is the feedback comparator which gives feedback of the outputted voltage to the control section so as to stabilize the outputted voltage.

5. A switched-capacitor-type stabilized power circuit, comprising:

switching elements provided before and after a capacitor;

a control section which controls the switching elements, for switching a connection of the capacitor and an inputted direct-current power source between series and parallel, so as to carry out step-up operation;

a constant voltage circuit which supplies power to the control section; and switching means for selecting an inputted direct-current voltage at rising of the inputted direct-current voltage, and selecting an outputted voltage after the rising of the outputted voltage and selecting a off-state when the outputted voltage is higher than a predetermined level, for a voltage supplied to the constant voltage circuit.

6. The switched-capacitor-type stabilized power circuit as set forth in claim 5, further comprising:

a step-up circuit which carries out a step-up operation with respect to the voltage supplied to the constant voltage circuit at the rising of the inputted direct-current voltage.

7. The switched-capacitor-type stabilized power circuit as set forth in claim 6, further comprising:

step-up stopping means for cutting off the voltage supplied to the constant voltage circuit after the rising of the outputted voltage.

8. The switched-capacitor-type stabilized power circuit as set forth in claim 7, wherein:

the step-up stopping means is a feedback comparator which gives feedback of the outputted voltage to the control section so as to stabilize the outputted voltage.

* * * * *